United States Patent [19]

Merchant et al.

[11] Patent Number: 5,581,366
[45] Date of Patent: Dec. 3, 1996

[54] METHOD AND APPARATUS FOR ORIGINATING A FACSIMILE MESSAGE IN A SELECTIVE CALL RECEIVER

[75] Inventors: Zaffer Merchant, Lantana; Ali Saidi, Boynton Beach, both of Fla.

[73] Assignee: Motorola, Inc., Schaumburg, Ill.

[21] Appl. No.: 287,321

[22] Filed: Aug. 8, 1994

[51] Int. Cl.⁶ ............................... G08B 5/22; H04N 1/00
[52] U.S. Cl. .................. 358/400; 358/402; 358/403; 358/440; 340/825.44
[58] Field of Search ...................... 340/825.44; 358/400, 358/402, 403, 440

[56] References Cited

U.S. PATENT DOCUMENTS

| | | | |
|---|---|---|---|
| 3,976,995 | 8/1976 | Sebestyen | 340/337 |
| 4,644,352 | 2/1987 | Fujii . | |
| 4,769,764 | 9/1988 | Levanon | 364/708 |
| 4,839,634 | 6/1989 | More | 340/712 |
| 4,879,759 | 11/1989 | Matsumoto et al. | 455/348 |
| 4,897,733 | 1/1990 | Sakaguchi et al. . | |
| 4,920,427 | 4/1990 | Hirata . | |
| 4,933,770 | 6/1990 | DeSpain . | |
| 4,972,457 | 11/1990 | O'Sullivan | 379/59 |
| 5,043,721 | 8/1991 | May | 340/825.44 |
| 5,281,962 | 1/1994 | Heuvel et al. | 340/825.44 |
| 5,307,297 | 4/1994 | Iguchi et al. | 364/708.1 |
| 5,337,314 | 8/1994 | Hoff | 370/94.1 |
| 5,398,115 | 3/1995 | Lin | 358/407 |

OTHER PUBLICATIONS

Motorola Product Sheet for Optrx Pager.
Wired "Wild Things" Packet Faxxer Oct. 12, 1993.
Motorola product sheet for NewsStream Data Receiver. Printed in U.S. 36 USC 380, produced by Motorola Marketing Services.
Motorola product sheet for minitor II. Printed in U.S.A. (8602) C.P.
Motorola product sheet for optrx Pager. Printed in U.S.A. (8509) P.A.

Primary Examiner—Edward L. Coles, Sr.
Assistant Examiner—Kevin L. Chapple
Attorney, Agent, or Firm—Kelly A. Gardner

[57] ABSTRACT

A selective call receiver (12) having a pen input capable display screen (50) for inputting a message by pen stylus (60) to be facsimile transmitted. A auxiliary cradle unit (13) is provided which mates and electrically connects with the selective call receiver (12). The auxiliary cradle unit comprising a fax modem (64) for receiving as input the message to be facsimile transmitted and for modulating and transmitting the message. An electronic fax message form (100) may be used to transmit the fax message to another selective call receiver (40), or the fax message is transmitted to a fax machine (14).

13 Claims, 6 Drawing Sheets

5,581,366

METHOD AND APPARATUS FOR ORIGINATING A FACSIMILE MESSAGE IN A SELECTIVE CALL RECEIVER

FIELD OF THE INVENTION

This invention relates in general to the field of selective call receiver communication systems, and more particularly to a selective call receiver having facsimile (fax) message originate and reply capability.

BACKGROUND OF THE INVENTION

Presently, efforts have been made to enable the transmission of a facsimile message from a facsimile machine or facsimile capable personal computer to a graphics selective call receiver (pager) or a pager equipped graphics device. However, heretofore, there is no capability of originating and sending a facsimile message from the pager device.

Thus, it is desirable to provide a pager or pager equipped device with the capability to originate and send a facsimile message to another pager or to a fax machine.

SUMMARY OF THE INVENTION

Briefly, according to one aspect of the present invention, there is provided a selective call receiver (pager) having facsimile origination capability. The selective call receiver is equipped with a display screen having pen input capability. A separate auxiliary cradle unit is provided that mates with and receives the selective call receiver, and which includes a wireline fax modem. To originate a fax message the selective call receiver is placed in the auxiliary cradle unit and a handwritten note or drawing is entered on the display screen using the pen input capability. Alternatively, a virtual keypad is displayed to facilitate user input.

In accordance with another aspect of the present invention, a fax originate/reply system for selective call receivers is provided, the system comprising:

a plurality of selective call receivers, two or more of said selective call receivers having a display and input means for inputting a message to be facsimile transmitted and an identifier of a selective call receiver to receive the facsimile message;

an auxiliary cradle unit for mating with the selective call receiver and having a fax modem and a communications network port, the auxiliary cradle unit receiving the message to be facsimile transmitted, assimilating the message into an electronic fax message form and transmitting the form via the fax modem over said communications network; and a selective call terminal for connection to the communications network and having a selective call terminal processor, a base station for transmitting paging signal to one or more of a plurality of selective call receivers, the selective call terminal processor receiving the electronic fax message form transmitted by said fax modem, decompressing the facsimile message, decoding the identifier in the electronic fax message form to determine the particular one of the plurality of selective call receivers designated to receive the fax message, and generating a paging signal including information representing the facsimile message.

In accordance with still another aspect of the present invention, a method for transmitting a facsimile message from a first selective call receiver to at least a second selective call receiver is provided, the method comprising steps of:

inputting an identifier of a selective call receiver designated to receive a fax message;

inputting a fax message in the first selective call receiver;

assimilating the identifier and the fax message into an electronic fax message form;

mating the first selective call receiver with a fax modem which transmits the electronic fax message form to a selective call terminal;

decoding the identifier in the electronic fax message form at the selective call terminal; and transmitting a paging signal including information representing the fax message for receipt by the selective call receiver having an address corresponding to the identifier in the electronic fax message form.

DESCRIPTION OF A PREFERRED EMBODIMENT

Figure 1:
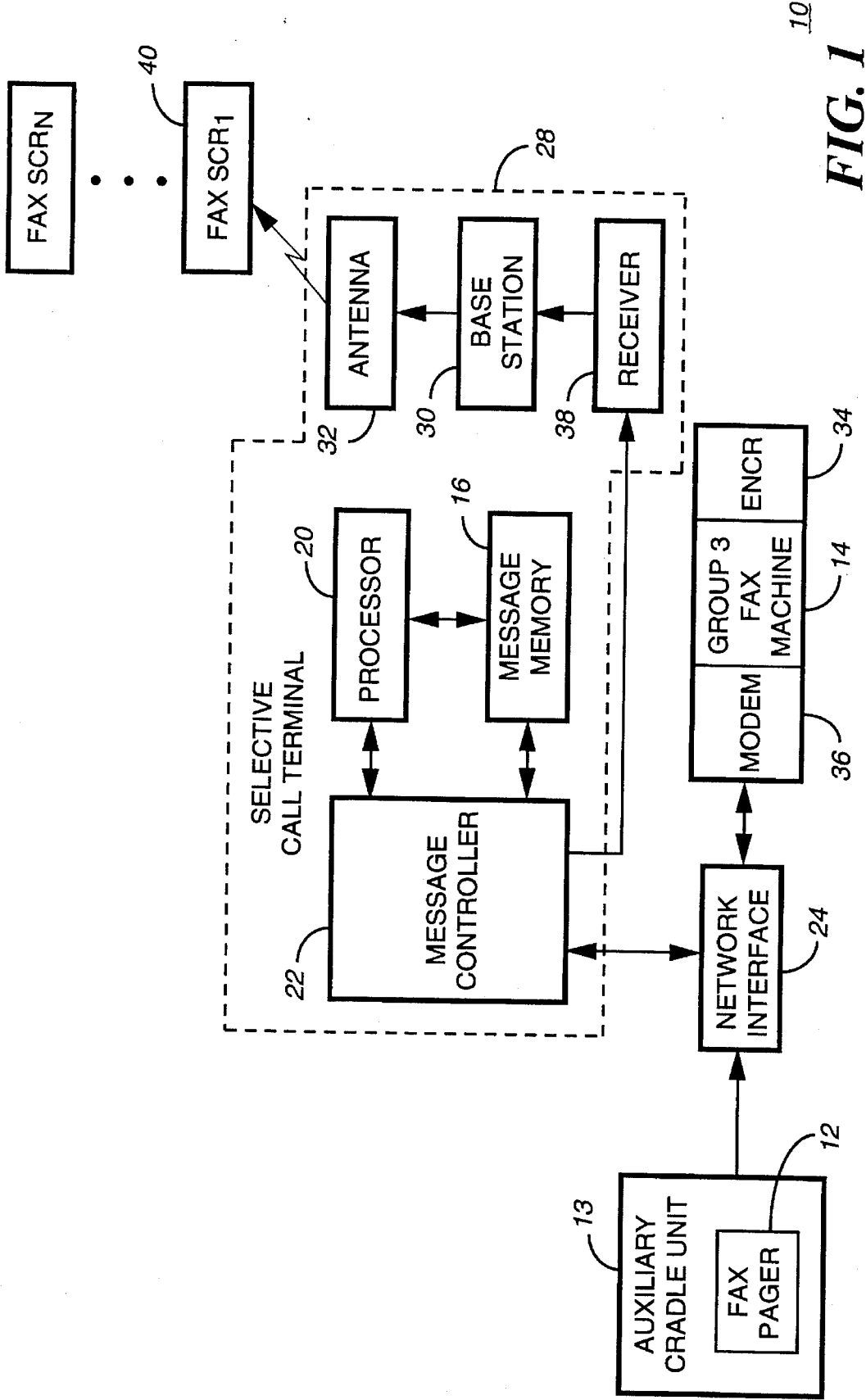
FIG. 1 is a block diagram of a fax selective call receiver communication system having fax message origination and reply capability in accordance with the present invention.

Referring first to FIG. 1, a fax selective call receiver system is shown generally at 10, and is designed to originate a facsimile (fax) message in a fax selective call receiver (SCR) or pager 12, via an auxiliary cradle unit 13 for transmission to another fax SCR 40 or to a fax machine 14.

The selective call receiver system 10 comprises a selective call terminal 28 which comprises a selective call terminal processor 20, a message controller 22, a receiver 38, a base station 30 and an antenna 32. Messages, such as fax messages, are sent to the selective call terminal via a network interface 24, such as the public telephone switching network (PTSN) 24. The fax machine 14 includes an encoder 34 and a modem 36 to compress and modulate/demodulate a fax message for transmission over, or reception from, the network interface 24.

Figure 2:
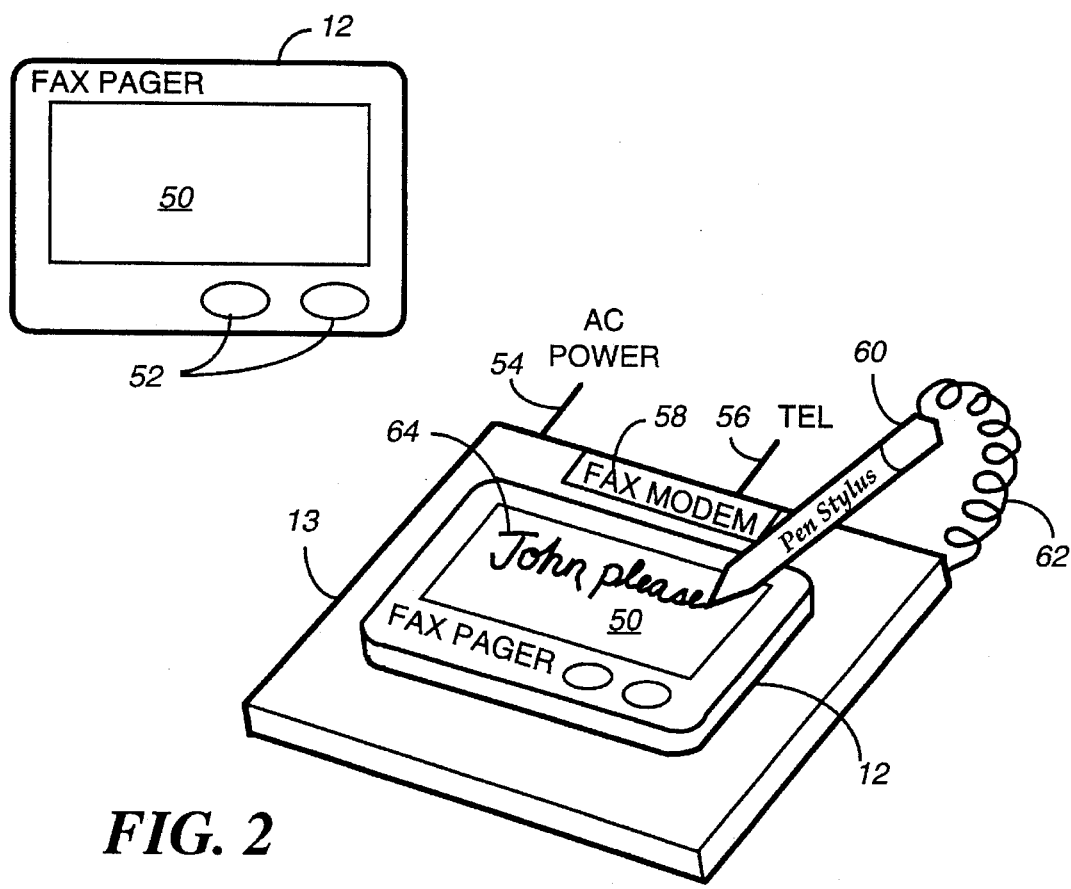
FIG. 2 is a front perspective view of a fax selective call receiver and associated auxiliary cradle unit in accordance with the present invention.

FIG. 2 illustrates the fax SCR 12 and the auxiliary cradle unit 13 in greater detail. The fax SCR 12 comprises a display screen 50, and mode control buttons 52 to switch the power and control display modes of the fax SCR 12. As will be explained further hereinafter, the display screen 50 is capable of displaying information as well as receiving touch-pen input of data.

The auxiliary cradle unit is designed to mate with and receive the fax SCR 12, similar to conventional pager battery charger devices. For example, the auxiliary cradle unit has a recess (not shown) with contact terminals CT therein, to receive the fax SCR 12 and mate with contact terminals PT of the fax SCR. The auxiliary cradle unit 13 includes an alternating current (AC) power input 54, a telephone port 56, a fax modem 58 connected to the telephone port 56 and a pen stylus input device 60.

The pen stylus input device 60 is preferably attached by a cord 62 to the auxiliary cradle unit 13. The display screen 50 of the fax SCR 12 is responsive to touch by the pen stylus input device so as to activate pixels thereof, thereby creating an image of a handwritten message, such as the message shown at 64. Alternatively, software may be provided in the SCR 12 for displaying a virtual keypad 91, which are well known in the art, to input alphanumeric and other characters.

Figure 3:
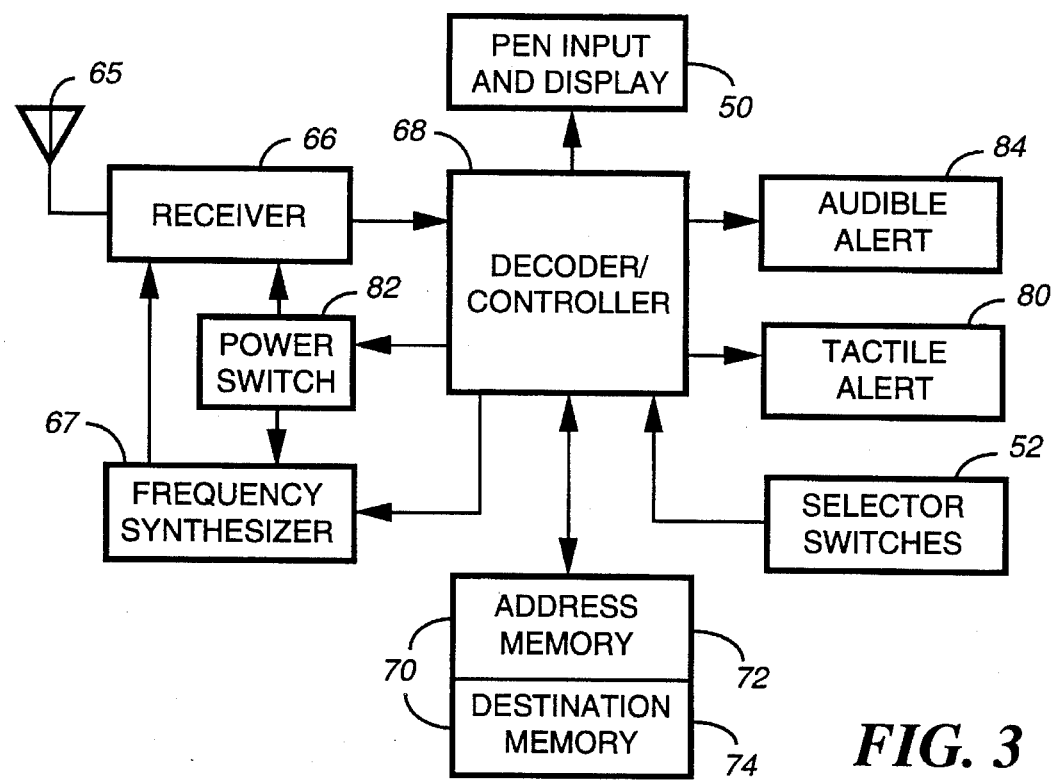
FIG. 3 is a block diagram of a fax selective call receiver in accordance with the present invention.

FIG. 3 illustrates the components of the fax SCR 12 or 40, it being understood that both the fax SCR 12 and the fax SCR 40 have fax originate and fax receive capabilities. The fax SCR 12 or 40 comprises an antenna 65, a receiver 66, a frequency synthesizer 67, a decoder/controller 68, a code plug memory 70 including an address memory 72 and a destination memory 74. In addition, various alert devices are provided, such as the tactile alert 80 and the audible alert 84. A power switch 82 is also provided to activate and deactivate certain components of the fax SCR 12. The pen input and display 50 and the selector/mode control switches 52 are also shown in FIG. 3.

The pen stylus device 60 and the display screen 50 are well known in the art, and interact to translate touch by a narrow point pen device, and software in the decoder/controller 68 tracks the pen stylus position to activate pixels on the display screen. The image created by activating the pixels is stored in a memory for further processing in accordance with the present invention.

Figure 4:
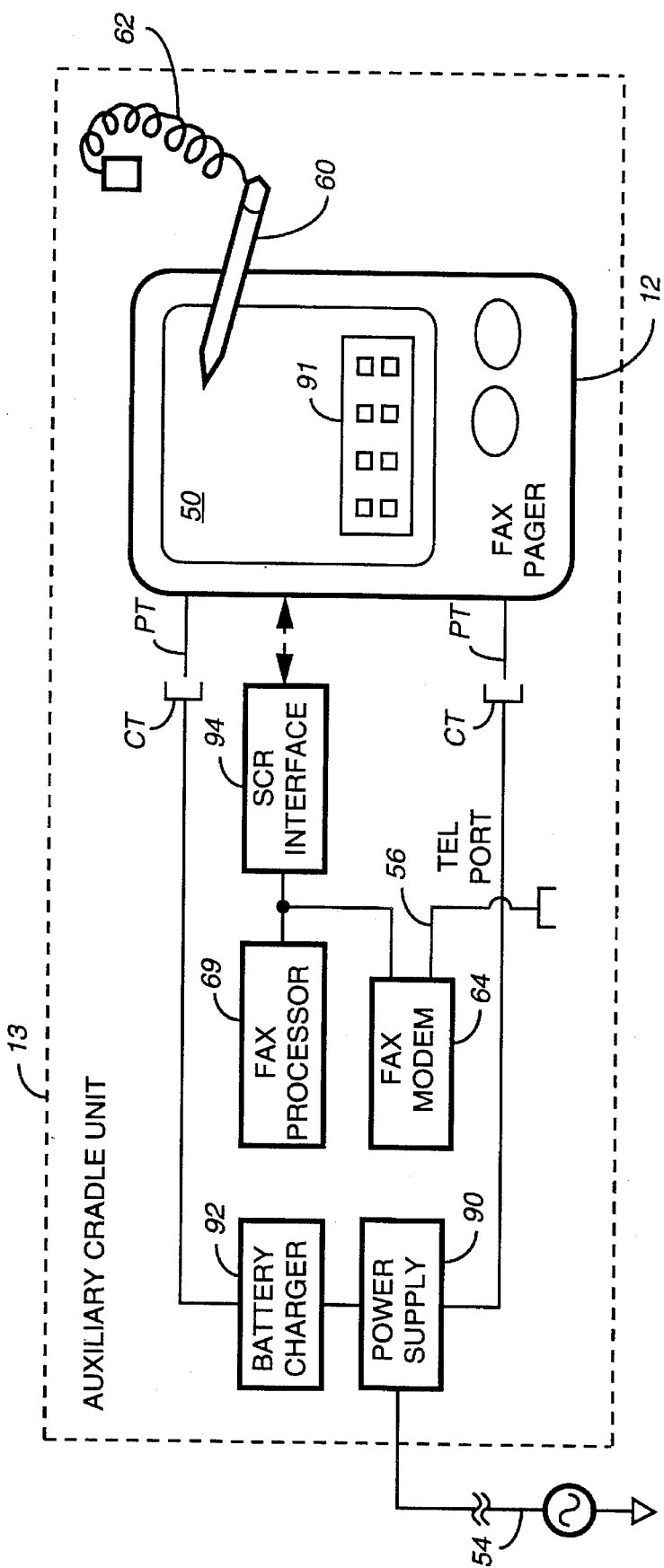
FIG. 4 is a block diagram of an auxiliary cradle unit in accordance with the present invention.

FIG. 4 illustrates the internal components of the auxiliary cradle unit 13. The auxiliary cradle unit 13 comprises a power supply 90 for converting AC power to DC voltages, a battery charger 92 for charging batteries in the fax SCR 12. An SCR interface 94 is provided to enable communication between the auxiliary cradle unit and the fax SCR 12.

Specifically, the SCR interface 94 represents a standard interface protocol between fax modems and computers, or in the case of the present invention, between fax modem 64 and the SCR 12 (particularly the decoder/controller 68). The standard is one set by the Telecommunications Industry Association (TIA) for interaction between computers (hosts) and fax modems.

The auxiliary cradle unit 13 further comprises a fax processor 69 for processing the image of a handwritten message and assimilating the handwritten fax message into a particular electronic message format (or no format as the case may be) for transmission via the fax modem 64. Alternatively, the functions of the fax processor 69 are performed by the decoder/controller 68. It should be appreciated that there are certain power and cost saving advantages to providing the fax processing functions in the auxiliary cradle unit 13, rather than in the SCR 12.

Figure 5:
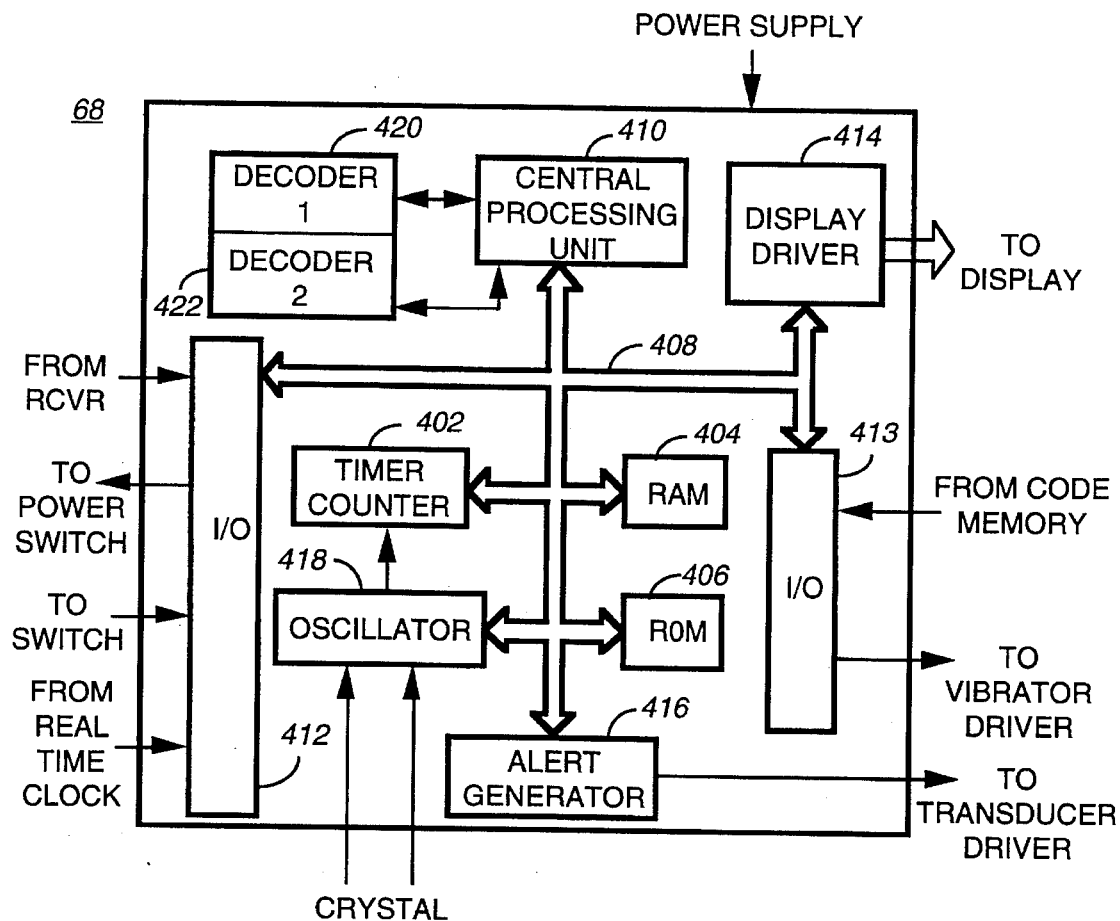
FIG. 5 is an electrical block diagram of the decoder/controller of the fax selective call receiver.

Turning to FIG. 5, the components of the fax SCR decoder/controller 68 are shown. A detailed explanation of these components is not needed for purposes of understanding the present invention. Briefly, at its heart, the decoder/controller 68 comprises a central processing unit 410 which processes software instructions stored in a ROM 406. Data flow into and out of the decoder/controller 68 is controlled by input/output (I/O) ports 412 and 413. A timing mechanism for the fax SCR is generated by a crystal driven oscillator 418. A timer counter 402 is connected to the oscillator 418 for certain timing functions.

One or more decoders, shown at 420 and 422, are provided to, for example, decode portions of a fax message that are encoded for reasons to be explained hereinafter. The central processing unit 410 generates display control signals which are used to drive the display 50 (FIG. 2), and to call for generation of alert signals via an alert generator 416. In addition, a facsimile compression code-book is stored in the RAM 404 or ROM 406 to permit the decompression of a compressed facsimile message.

Figure 6:
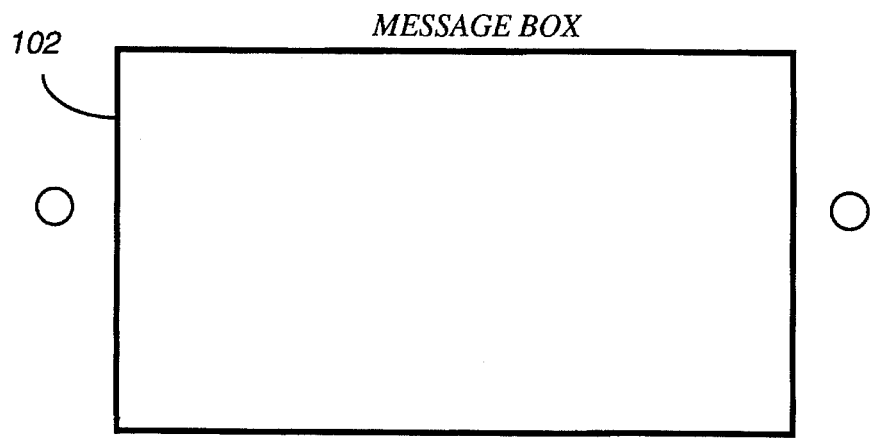
FIG. 6 is a diagram illustrating an electronic fax message form used in accordance with the present invention.

In accordance with the present invention, a fax message generated on the display screen of a selective call receiver is assimilated into an electronic fax message form to more efficiently transmit the message for display on another fax SCR. An example of an electronic fax message form is shown in FIG. 6

The fax message form, shown generally at 100 comprises a message box 102 which contains the body of the message, a pager pin number block 104 including "bubbles" for spelling out a numeric code, also called a pager ID (PID), corresponding to an address of a particular fax SCR having fax reception capabilities. In addition, a heading portion 106 is optionally provided to insert characters identifying the name of the sending and receiving parties. The fax message form 100 is a vehicle for assimilating the data in a fax message to be transmitted to a SCR. The form itself can take the form of a physical sheet of paper, a template in a computer word processor or as a data file template in memory.

As mentioned above, either the fax processor 69 of the battery charger unit 13 or the decoder/controller 68 of the SCR 12 can perform the fax processing, using known fax processing software, and the associated software, codebooks, etc., are stored in the appropriate one of the units, but need not be stored in both units. The software for the electronic fax message form and software for assimilating a handwritten message into the form preferably is stored in the SCR, in either case.

Figure 7:
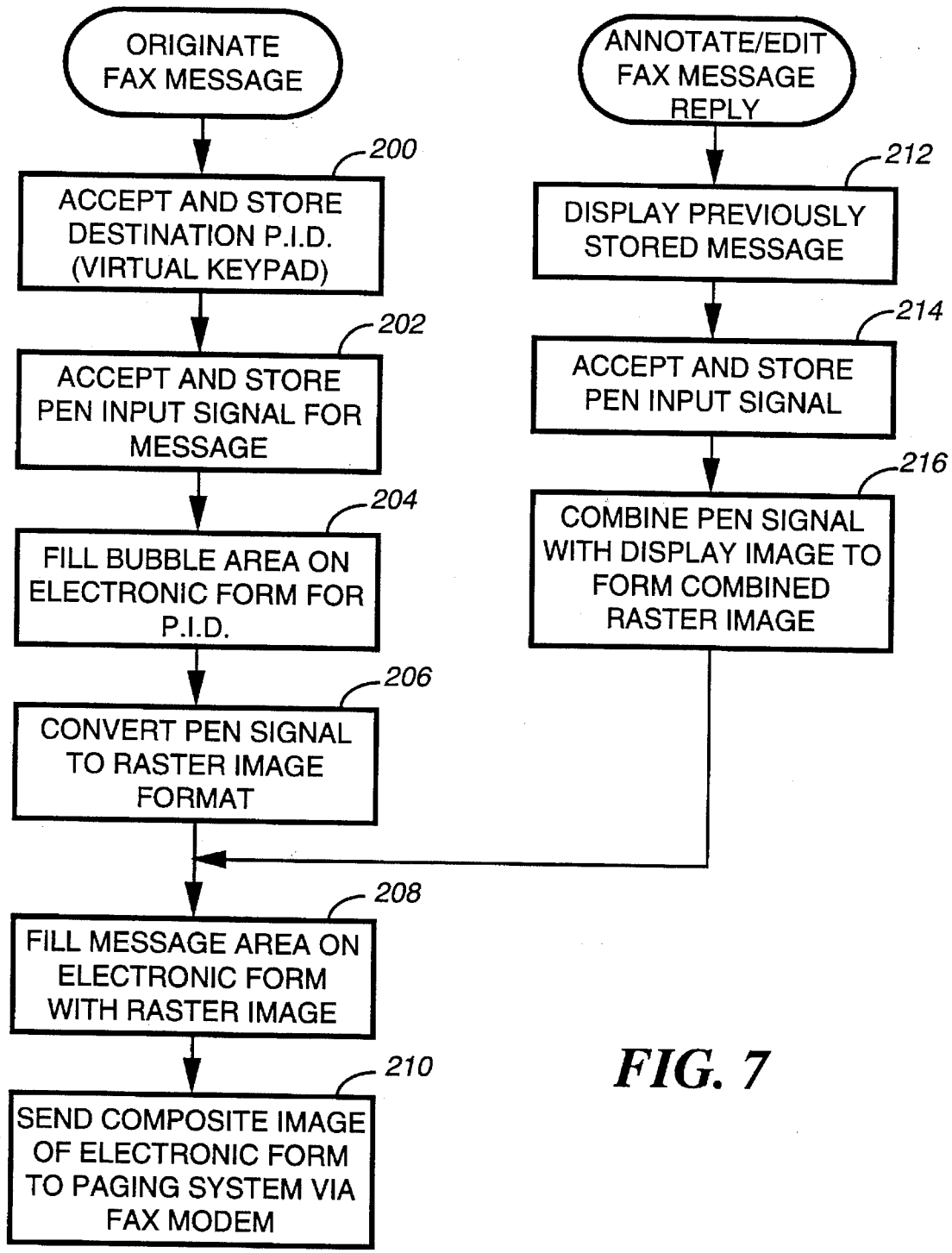
FIG. 7 is a flow chart illustrating the processing steps to originate and send a fax message in a fax selective call receiver according to the present invention.

According to the present invention, a mechanism is provided for entering information into the electronic fax message form through the use of a pen input display on an SCR, and specialized software. FIG. 7 is a flow chart illustrating the steps for originating a fax message from an SCR. The steps shown in FIG. 7 are embodied in the form of a software application which includes instructions that are executed by the central processing unit 410 of the decoder/controller 68. To do this by way of a pen input device, software is stored in the microcomputer 68 for generating on the display screen 50 a virtual keypad including virtual keys for alphanumeric and other characters. Thus, to transmit and receive a fax message on a SCR becomes just as simple as sending a message on an electronic mail ("Email") system between personal computers, for example, and the present invention achieves a user interface which is as easy to use as an Email system.

In addition, a graphical icon is optionally displayed on the display screen 50, which when activated by pen input, opens the fax messaging application program stored in the microcomputer 68. Once the fax messaging application is open, in step 200, the address or pager identification (PID) of the SCR to receive the message is entered via the virtual keypad by the user. This is prompted by displaying a suitable message on the display 50. Next, in step 202, a handwritten message is input by the pen 60 either graphically by hand or by virtual keypad. The display is cleared to allow room for the message. In step 204, the PID entered by the user is electronically "filled" or assimilated into the electronic fax message form, transparent to the user.

Next, in step 206, the message entered in step 202 is converted to a raster (scanned) image format. Then, in step 208, the message box 102 in the electronic fax message form is electronically "filled" with the raster image, again preferably transparent to the user. Finally, in step 210, the bit map image of the electronic fax message form is transmitted to the selective call terminal 28 by the fax modem 64 in the auxiliary cradle unit 13.

Specifically, the fax message is encoded and compressed by the fax processor 69 in the auxiliary cradle unit (or by the decoder/controller in the SCR 12) according to the Group III fax coding scheme which is well known to one of ordinary skill in the art. The Group III facsimile machine is defined under the CCITT (Consultative Committee on International Telegraph and Telephone). The Group III facsimile standards for encoding and compressing data are performed using the coding scheme known as the modified Huffman code. The modified Huffman code uses the standard Huffman code in conjunction with the modified READ (Relative Element Addressing Designate) code. Once the information is Group III encoded and compressed, the selective call terminal 28 is dialed and a connection is made. Then, the fax message is transmitted by the fax modem 64 to the message controller 22 via the network interface (PSTN) 24. The message controller 22 directs the information to the selective call terminal processor 20 for providing additional processing of the information suitable for selective call communication. After storing at least a portion of the information in a message memory 16, the processor 20 and the message controller 22 process the compressed facsimile message, similar to how a fax machine receives a fax. In particular, the fax message is decompressed and then re-compressed using a codebook that is optimized for the types of images sent to selective call receivers. A similar codebook is stored in the decoder/microcontroller of the fax selective call receiver to enable decompression of the transmitted fax message.

When the selective call terminal 28 has completed processing the incoming fax message, a receiver 38 receives the fax message and a transmitter which comprises a base station 30 and an antenna 32, broadcasts a signal modulated with the fax message information representing the selective call address (corresponding to the PID) and the fax message. A selective call receiver 40 is then able to detect its address, recover the fax message information, alert the user, and make the received information available for presentation to the user in a variety of formats including but not limited to ASCII text, characters, graphics and audio.

Specifically, in the SCR 12, demodulated data generated by the receiver 66 is coupled into the decoder/controller 68 through an input/output (I/O) port 412. The demodulated data is processed by the CPU 410 and when the received address is the same as that stored within the code-plug memory which couples into the decoder/controller 68 through, for example an I/O port 413, the selective call fax message is received and stored in RAM 404. Recovery of the stored message, and selection of the predetermined destination address, is provided by the switches which are coupled to the I/O port 412. The decoder/controller 68 then recovers the stored message, decompresses it using the stored codebook, and directs the information over the data bus 408 to the display driver 414 which processes the information and formats the information for presentation by the display 50 (FIG. 3) such as an LCD (liquid crystal display). When the selective call receiver 40 receives its address, the alert signal is generated which can be routed through the data bus 408 to an alert generator 416 that generates the alert enable signal which is coupled to the audible alert device, described above. Alternatively, when the vibrator alert is selected, as described above, the decoder/controller 68 generates an alert enable signal which is coupled through data bus 408 to the I/O port 413 to enable generation of a vibratory, or silent alert.

In accordance with the present invention, a reply to a received fax message can be created, without generating an entirely new message. The reply function is implemented by software, again stored in the decoder/controller 68. Referring to the right-branch of FIG. 7, in step 212, to generate a reply message, a received message is displayed in a ghosted format, for example, leaving room on the display for a user to enter a reply message by pen input in step 214. Next, in step 216, the pen input data is then combined with the displayed image (ghosted received fax message) to form a combined raster image. The process then continues at step 208 as explained above. In this manner, it is not necessary to enter the PID to send a reply message to the SCR that sent the original message. As a result, to the user the fax reply process appears very similar to an Email system.

The fax SCR is also capable of generating and transmitting a fax message to a fax machine 14 (FIG. 1). In this case, the handwritten message need not be assimilated into the fax message form 100, and thus steps 200, 204 and 208 are not performed. Step 200 is modified to receive as input from the user a telephone number of the receiving fax machine. The handwritten message input in step 202 is converted into a raster image format as shown by step 206 and transmitted to by the fax modem 64 to the selective call terminal as shown by step 210. The telephone number of the receiving fax machine is dialed by the fax modem to establish a connection as is well known in the art.

An advantage to providing fax originate and reply capability in the manner described above is that battery power in the fax SCR is not used when the handwritten message is scanned and transmitted because the auxiliary cradle unit supplies the power for this function. Furthermore, the power supply to the pen input functions of the fax SCR display is optionally disabled when the fax SCR is not mated with the auxiliary cradle unit.

The above description is intended by way of example only and is not intended to limit the present invention in any way except as set forth in the following claims.

What is claimed is:

1. In combination, a selective call receiver for one-way communications over the air, the selective call receiver having receiving means for receiving information over the air and having a display screen and input means for inputting a message to be facsimile transmitted and an identifier representing a recipient of the message, and an auxiliary cradle unit having means for mating and electrically connecting with the selective call receiver, the auxiliary cradle unit comprising fax modem means for receiving as input the message to be facsimile transmitted and for modulating and transmitting the facsimile message to thereby provide message transmission capability to the selective call receiver, wherein the selective call receiver itself is incapable of transmitting information.

2. The combination of claim 1, wherein the auxiliary cradle unit comprises processor means for scanning an input facsimile message to be facsimile transmitted to generate a raster image and for assimilating the raster image of the input message into an electronic fax message form.

3. The combination of claim 1, wherein the selective call receiver comprises processor means for scanning an input message to generate a raster image and for assimilating the raster image into an electronic fax message form.

4. The combination of claim 2, and further comprising a selective call terminal for transmitting a paging signal suitable for detection by a plurality of selective call receivers, the fax modem means of the auxiliary cradle unit transmitting the electronic fax message form to the selective call terminal via a communications network.

5. The combination of claim 3, and further comprising a selective call terminal for transmitting a paging signal suitable for detection by a plurality of selective call receivers, the fax modem means of the auxiliary cradle unit transmitting the electronic fax message form to the selective call terminal via a communications network.

6. The combination of claim 4, wherein the selective call terminal comprises a base station for transmitting a paging signal to one or more of a plurality of selective call receivers, and a selective call terminal processor for receiving the electronic fax message form transmitted by said fax modem, decompressing the facsimile message, decoding the identifier in the electronic fax message form to determine the particular one of the plurality of selective call receivers designated to receive the fax message, and generating a paging signal including information representing said facsimile message.

7. The combination of claim 1, wherein the fax modem means comprises a wireline fax modem.

8. The combination of claim 7, wherein the fax modem of the auxiliary cradle unit dials a telephone number of a recipient fax machine corresponding to the identifier for transmitting the facsimile message to the recipient fax machine.

9. The combination of claim 1, wherein the input means comprises a virtual keypad displayed on the selective call receiver for inputting alphanumeric and other characters.

10. The combination of claim 1, wherein the input means of the selective call receiver comprises a display having pen input means, and said auxiliary cradle unit comprises a pen stylus for writing a message on the display of the selective call receiver.

11. A fax originate/reply system for selective call receivers comprising:

a selective call receiver having a display and input means for inputting a message to be facsimile transmitted and an identifier of a recipient device to receive the facsimile message, wherein the selective call receiver receives one-way communications over the air and is itself incapable of transmitting information;

an auxiliary cradle unit for mating with the selective call receiver and having a fax modem and a communications network port, the auxiliary cradle unit receiving the message to be facsimile transmitted, assimilating the message into an electronic fax message form and transmitting the form via said fax modem over said communications network, wherein the auxiliary cradle unit provides two-way communication capability to the selective call receiver; and a selective call terminal for connection to the communications network and having a selective call terminal processor, a base station for transmitting page message signals to one or more of a plurality of selective call receivers, the selective call terminal processor receiving the electronic fax message form transmitted by said fax modem, decompressing the facsimile message, decoding the identifier in the electronic fax message form to determine the particular one of the plurality of selective call receivers designated to receive the fax message, and generating a paging signal including information representing said facsimile message.

12. The system of claim 11, wherein the input means of the selective call receiver comprises a display having pen input means, and said auxiliary cradle unit comprises a pen stylus for writing a message on the display of the selective call receiver.

13. A method for transmitting a facsimile message from a first selective call receiver to at least a second selective call receiver, wherein the first selective call receiver receives one-way communications over the air and is itself incapable of transmitting information, the method comprising steps of:

inputting an identifier of the at least a second selective call receiver designated to receive a fax message;

inputting a fax message in the first selective call receiver;

assimilating the identifier and the fax message into an electronic fax message form;

mating the first selective call receiver with a fax modem which transmits the electronic fax message form to a selective call terminal to thereby provide two-way communication capability to the first selective call receiver;

decoding the identifier in the electronic fax message form at the selective call terminal; and transmitting a paging signal including information representing the fax message for receipt by the at least a second selective call receiver having an address corresponding to the identifier in the electronic fax message form.

\* \* \* \* \*